United States Patent

[11] 3,596,275

[72] Inventor Richard G. Sweet
C/O Minneapolis-Honeywell Regulator Co., Philadelphia Division, Wayne & Wendrim Avenues, Philadelphia, Pa. 19144
[21] Appl. No. 354,659
[22] Filed Mar. 25, 1964
[45] Patented July 27, 1971
Continuation-in-part of application Ser. No. 298,996, July 31, 1963, now abandoned.

[54] FLUID DROPLET RECORDER
33 Claims, 15 Drawing Figs.
[52] U.S. Cl. .................................................. 346/1, 346/75, 317/3
[51] Int. Cl. .................................................. G01d 15/18
[50] Field of Search.......................................... 346/75, 140; 317/3; 239/3, 4, 15; 178/96

[56] References Cited
OTHER REFERENCES

Magaruey & Taylor; Apparatus For The Production Of Large Water Drops; The Review of Scientific Instruments, Vol. 27, No. 11, Nov. 1956, pages 944-947.

Hendricks; Charged Droplet Experiments; Journal Of Colloid Science, Vol. 17, No. 3, March 1962, Pages 249-259.

Magaruey & Blackford; Experimental Determination Of The Charge Induced On Water Drops; Journal Of Geophysical Research, Vol. 67, No. 4, April 1962, pages 1421-1426.

*Primary Examiner*—Joseph W. Hartary
*Attorney*—Flehr & Swain

ABSTRACT: A direct writing signal recording system which writes on a record medium by projecting a stream of writing fluid in the form of a succession of uniformly spaced droplets. The droplets are charged electrostatically in accordance with instantaneous signal values and then deflected electrostatically in accordance with the charges carried by the droplets. Droplets may be directed to intercepting means whereby droplets so directed are not deposited on the record medium.

INVENTOR.
RICHARD G. SWEET
BY Arthur H. Swanson
ATTORNEY.

PATENTED JUL 27 1971 3,596,275

INVENTOR
RICHARD G. SWEET
BY Arthur H Swanson
ATTORNEY.

INVENTOR.
RICHARD G. SWEET
BY Arthur H. Swanson
ATTORNEY.

INVENTOR.
RICHARD G. SWEET

BY

ATTORNEY.

FLUID DROPLET RECORDER

The present application is a continuation-in-part of application Ser. No. 298,996, filed July 31, 1963 and now abandoned.

This invention relates to signal apparatus, and more particularly to a direct writing signal recording system.

It is an object of the present invention to provide an improved recording system which is capable of recording a wide band of input signals which may vary in frequency from direct current signals to signals having frequencies in the kilocycle range.

It is another object of the present invention to provide an improved recording system as set forth and wherein direct ink recording is employed while obviating the necessity for a physical engagement between a stylus and the record member.

It is a further object of this invention to provide a recording instrumentality as set forth which incorporates the versatility of electrostatic deflection while retaining the advantages of immediate visibility and permanency of direct ink recording.

In accomplishing these and other objects, there has been provided, in accordance with the present invention, a recording instrument wherein a jet of writing fluid or ink is caused to issue from a nozzle in the form of a succession of tiny individual droplets which are directed toward the surface of a record member. As the individual droplets are formed, they are given an electrostatic charge which is a function of the instantaneous value of an input signal which is to be recorded. The charged droplets are caused to pass between a pair of electrostatic deflection plates. A constant high-voltage charge is applied to the deflection plates to produce a constant high-voltage electric field between the two plates. As the charged droplets pass through the electric field, they are deflected from their normal path by an amount which is a function of the magnitude of the charge on each of the droplets and in a direction which is a function of the polarity of the charge on the individual droplets. Means are provided for assuring that the droplets occur at regular intervals and are uniform in size.

A better understanding of this invention may be had from the following detailed description when read in connection with the accompanying drawings, in which.

Figure 1:
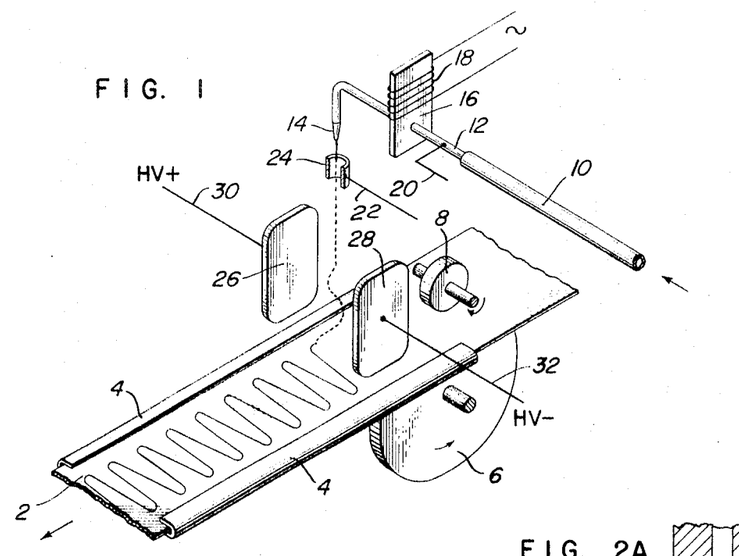
FIG. 1 is a perspective view of apparatus embodying and illustrating the present invention.

Referring now to the drawing in more detail, there is shown in FIG. 1 apparatus which illustrates the inventive concept constituting the present invention. This apparatus includes a record receiving member 2, such as a strip of record paper, which is arranged to be driven through a suitable paper guide 4 by means of a drive roller 6 and a pressure roller 8. Record writing fluid is supplied to the system through a tube member 10, a feed pipe 12 and a nozzle 14 under a hydrostatic pressure head of between 40 and 100 lbs. per square inch. The writing fluid, or ink, issues from the nozzle 14 in a jet which may be on the order of 1/1,000 of an inch in diameter. Issuing thus from the nozzle, the jet has a natural tendency, due at least in part to surface tension of the fluid, to break up into a succession of tiny droplets. In order to assure that the droplets will be substantially uniform in dimension and frequency, means are provided for introducing regularly spaced varicosities in the issuing jet. These varicosities, or undulations in the cross-sectional dimension of the issuing jet stream, are made to occur at or near the natural frequency of the formation of the droplets. This frequency may typically be on the order of 120,000 per second. In the structure shown in FIG. 1 the varicosities are introduced into the issuing jet stream by vibrating the feed pipe 12, hence the nozzle 14, at the desired frequency. This is accomplished by means of a magnetostrictive driving element 16 which is excited by a suitable driving coil 18.

In accordance with this invention, the signals to be recorded are applied directly to the writing fluid. In accomplishing this it is assumed that the writing fluid, or ink, is, itself, electrically conductive. The signal to be recorded is applied to the instrument over a first and second lead wire 20 and 22, respectively. The first lead wire 20 is connected to the feed pipe 12, if that feed pipe 12 is made of electrically conductive material. Otherwise the lead 20 is connected through the wall of the feed pipe 12 into engagement with the ink therewithin. THe second lead wire 22 is connected to a tubular charging ring or electrode 24. The charging electrode 24 is positioned to surround the path of the ink jet and is positioned relative to the nozzle 14 such that the actual formation of the discrete droplets occurs within the region surrounded by the electrode 24. Thus, as an individual droplet separates from the continuous stream of the ink supply, it carries with it an electrostatic charge which is proportional to the instantaneous value of the input signal at the instant of separation. Thus each droplet of ink or writing fluid will have its own unique charge characteristic.

These droplets are directed, at relatively high velocity, toward the surface of the record receiving member 2. In their path towards the surface of the record receiving member 2, the droplets are caused to pass between a pair of electrostatic deflecting electrodes or plates 26 and 28, respectively. These plates 26 and 28 are oppositely charged to a relatively high constant voltage. The deflecting plate 26 might, for example, be charged to a positive 8,000 volts through the lead 30, while the plate 28 might be charged to a negative 8,000 volts through the lead 32. This produces an electric field between the two plates having a total potential difference of 16,000 volts with the two plates spaced about one-half inch apart. As the individually charged droplets pass through the electric field thus produced, they are individually deflected from their straight line path by an amount which is a function of the magnitude of the charge on the particular droplet. The direction of the deflection will be determined by the polarity of the charge on the droplet relative to the electric field.

Since the charge on the deflection plates is constant and the signal to be recorded appears as a charge on the individual droplets, the frequency response characteristic of the recording instrument is not limited by the transit time of the droplets between the deflection plates. Since each droplet carries its own unique charge signal, the frequency response capability of the recording instrument is limited only by the frequency of the reoccurrence of the individual droplets. With the droplets occurring at the rate of 120,000 per second, it is apparent that the frequency response characteristic of the recorder approaches one-half of the recurrent frequency of the droplets themselves as a practical limit.

Figure 2:
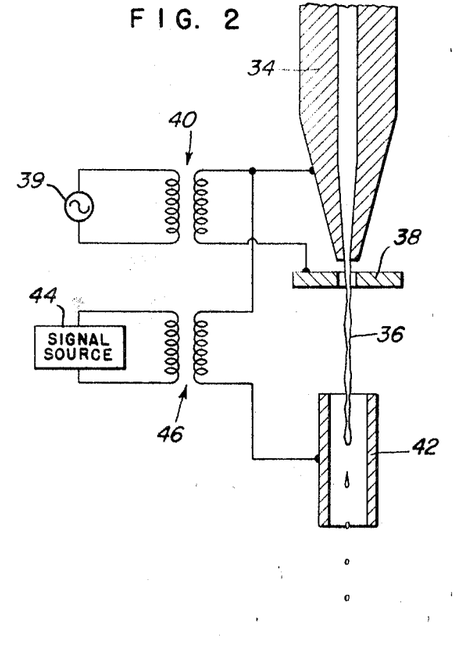
FIG. 2 is a fragmentary cross-sectional view of a somewhat different form of one of the details of the apparatus embodying the present invention.
Figure 2A:
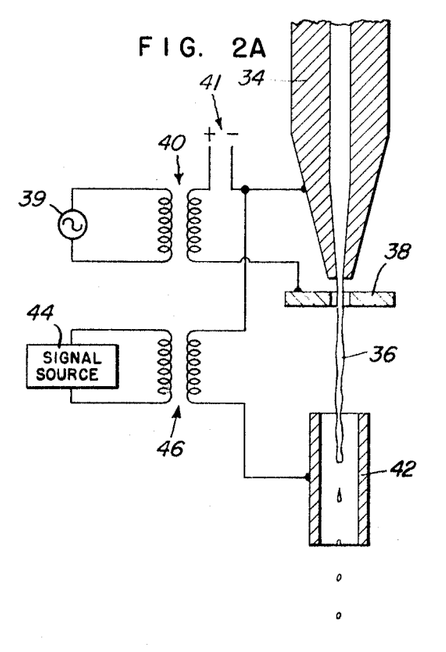
FIG. 2A is a view similar to FIG. 2 but showing a DC bias on the charging circuit.

The structure shown in FIG. 2 is somewhat different from that shown in FIG. 1 in that a different means is provided for introducing the varicosities in the jet stream issuing from the nozzle. In that figure a nozzle 34 is shown from which the ink or writing fluid 36 issues in a stream. It is assumed for the purpose of this illustration, that both the nozzle and the writing fluid are electrically conductive. Very closely adjacent the issuing end of the nozzle and surrounding the jet stream there is a first or excitation electrode 38. A high frequency voltage source 39 is coupled by means of a transformer 40 to the nozzle 34 and the excitation electrode 38. The frequency of the applied signal is, of course, determined by the frequency at which the droplets are to be formed. That drop formation frequency is, in our illustrative example, 120,000 drops per second. Unless a DC bias is employed, the applied signal frequency will be one-half that of the drop formation frequency. Alternatively, as shown in FIG. 2A, a DC bias from the source 41 may be superimposed upon the high frequency excitation signal from the source 39 and applied to the excitation electrode 38. With the use of the DC bias, the double-frequency effect would be eliminated. Accordingly, in that case the frequency of the applied high frequency excitation would be identical to that of the desired drop rate. Since, as was assumed, both the nozzle and the fluid are electrically conductive, the application of the high frequency signal as thus described results in the production of a radially extending pulsating electrostatic field between the fluid stream and the electrode 28. The electrostatic forces thus produced cause pulsating stresses to be formed within the fluid stream, thereby introducing the desired varicosities. Positioned further along the fluid stream and surrounding that stream there is a charging electrode 42, comparable in position and function to the charging electrode 24 of FIG. 1. Signals to be recorded from a source 44 are coupled through a transformer 46 to the charging electrode 42 and a nozzle 34 whereby to impart signal charges to the formed droplets, as in the case of the structure shown in FIG. 1.

In the practice of this invention, it was found that under certain conditions an undesirable distortion was introduced into the record. It was further found that a cause of such distortion could be traced to the turbulent wake of each droplet affecting the movement of the succeeding droplets when the droplets follow each other along the same or approximately the same path. One approach to alleviating such distortion is shown schematically in FIG. 3 and 4. In the form of the invention there shown, the relative velocity of the droplets with respect to the ambient air is substantially reduced by introducing a stream of air which flows collinearly with the stream of droplets. As in the basic structure shown in FIG. 1, ink is supplied to a nozzle 48 through a feed pipe 50. The feed pipe, and hence, the nozzle 48 is vibrated by a magnetostrictive driver 52 which is, in turn, excited by a driving coil 54. As before, the frequency of the vibration is about 120,000 cps. The nozzle 48 projects into a passageway defined by a suitable wall means 56. The wall 56 is contoured to define a passageway that embraces substantially the entire path of the ink, or writing fluid, between the nozzle 48 and the surface of the record receiving member or paper 58. Within the passageway defined by the walls 56 there is located a pair of deflecting electrodes 60 and 62, respectively. Through suitable means, not shown, a constant flow of air is supplied, care being taken to assure that the flow of air through the passageway is laminar. In order to preserve the laminar flow of air through the passageway, particularly in the vicinity of the nozzle 48, the charging electrode is made in the form of a hollow streamlined strut 64 which surrounds that part of the nozzle 48 and feed pipe 50 which projects into the passageway. A small opening 66 is provided in the trailing edge of the strut 64, located opposite the end of the nozzle, through which the ink is projected toward the record receiving member 58. Since the several electrodes involved in this system are in at least closely spaced relation to the wall means 56, if not actually in physical contact with it, and since these electrodes carry relatively high voltages, it is preferable that the wall means be formed of an insulating material such as a suitable plastic.

Figure 3:
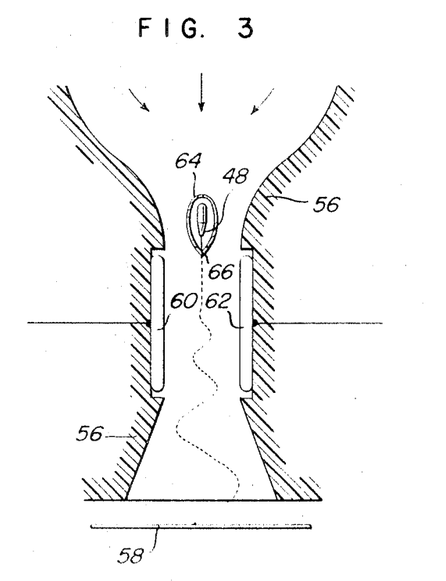
FIGS. 3 and 4 are two mutually perpendicular sectional views schematically illustrating means for introducing a stream of air which is collinear with the stream of ink droplets in apparatus such as that shown in FIG. 1.
Figure 4:
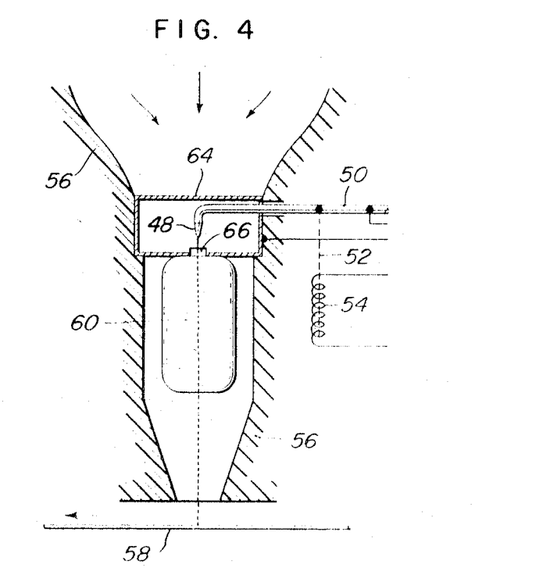

With the flow of air moving smoothly in the same direction as the projected droplets, the tendency for rapidly moving droplets to produce a disturbing wake is greatly reduced. In a successfully operated recorder constructed in accordance with this embodiment of the invention, an ink stream or jet length of substantially 2 inches, a velocity of the projected droplets of about 575 inches per second and an air stream velocity of between 380 and 500 inches per second was used and found to give satisfactory results.

Figure 5:
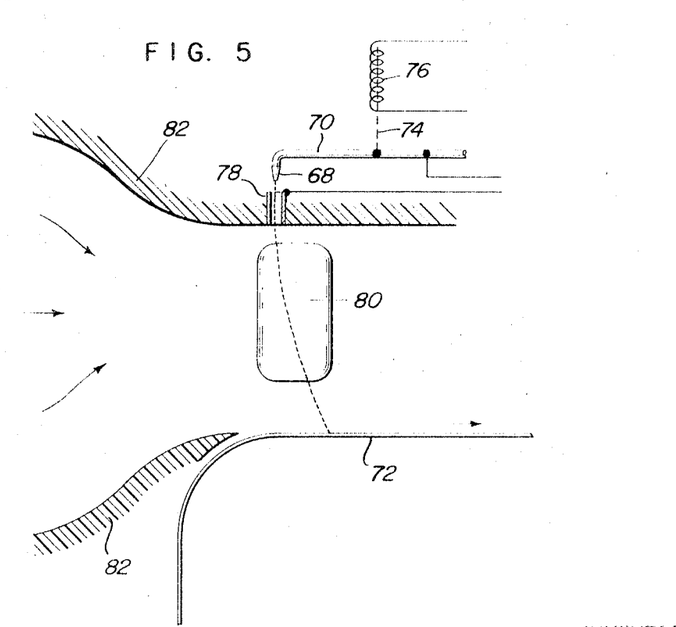
FIG. 5 is a side view schematically representing means for introducing a stream of air which is perpendicular to the stream of ink droplets in apparatus such as that shown in FIG. 1.

Another form of structure embodying the present invention and also providing means for obviating the disturbing effect of turbulent wake from the droplets is shown schematically in FIG. 5. In that form, the structure includes, as before, a nozzle 68 and a feed pipe 70 for projecting a stream of ink droplets toward the surface of a record receiving member 72. Here, too, means such as a magnetostrictive driver 74, excited by a driving coil 76, is provided for vibrating the feed pipe 70, and, hence, the nozzle 68, to produce the desired varicosities in the issuing ink stream. These varicosities, as previously mentioned, result in the formation of droplets which are uniform in size and spacing. The jet or stream of ink is charged in accordance with an input signal as it passes through a cylindrical charging electrode 78. It then, as before, passes between a pair of deflecting electrodes 80.

In this form, a constant velocity laminar stream of air is introduced into the system in the region through which the stream of droplets flows, the direction of the air stream being perpendicular to the ink droplet stream and collinear with the movement of the record receiving member. The air stream is controlled and directed by a passageway defined by wall means 82 which are, again, preferably made of an insulating material such as a suitable plastic. With the air stream flowing perpendicularly to the ink droplet stream, the disturbing turbulence of the droplet wake is carried downstream with the air flow. Thus, the wake of one droplet cannot influence the movement of succeeding droplets. The perpendicular flow of air will, of course, cause a bending of the stream of ink droplets, as indicated in the drawing. However, since the droplets are all of the same dimension and the air flow velocity is constant and laminar, the amount of the bending of the ink droplet stream is constant and may be calibrated into the recorder.

In a successfully operated recorder constructed in accordance with this embodiment of the invention, an ink jet length of about 1.25 inches, an ink drop velocity of about 1,000 inches per second, and an air stream velocity of about 420 inches per second was found to give satisfactory results.

Figure 6:
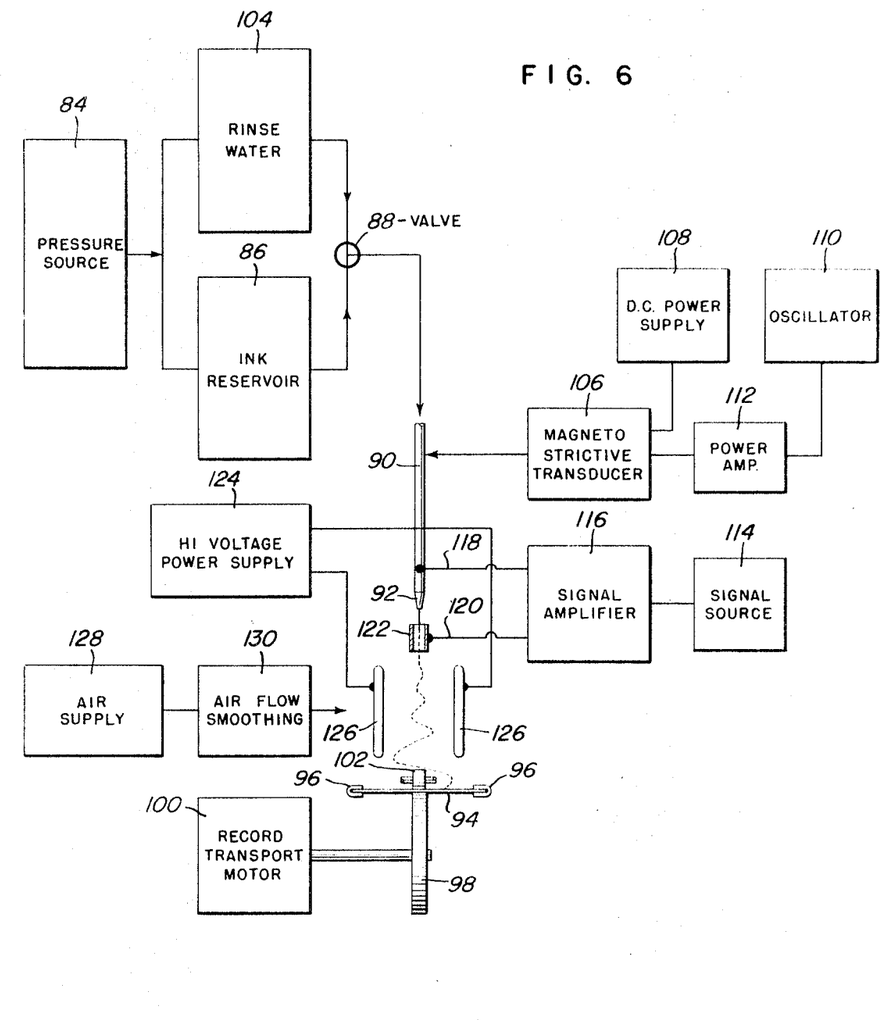
FIG. 6 is a block and schematic diagram representing a recording system constructed in accordance with the present invention.

In FIG. 6, there is shown a schematic representation of a complete recording system constructed in accordance with the present invention. A pressure source 84 is provided for establishing and maintaining a desired predetermined pressure head on an ink reservoir 86. The ink in the reservoir 86 is fed, under the selective control of a valve means 88, to a feed pipe 90 and, by the feed pipe, to a nozzle 92. The pressure on the ink supplied to the nozzle 92 causes the ink to be projected from the nozzle 92 toward a record receiving member 94. The record receiving member 94 is advanced at a predetermined velocity, through suitable guide means 96 by a drive roller 98 which is, in turn, driven by a suitable record transport motor 100. The drive roller 98 engages one surface of the record receiving member 94 while a pressure roller or idler 102 engages the opposite surface of the record receiving member 94.

When the recorder is to be turned off and not used for a time, it is desirable that ink be not allowed to stand in the nozzle 94. Since the inside diameter of the nozzle is on the order of one-thousandth of an inch, ink allowed to stand therein might tend to clog the opening when the ink has dried. One way of removing the residual ink from the nozzle is to wash it out with a suitable solvent which may well be water. To that end, a reservoir 104 is provided which contains rinse water. The pressure source 84 is also connected to the reservoir 104 to establish a suitable pressure head therein.

The valve means 88 is selectively operable to interrupt the flow of ink from the reservoir 86 and to substitute a flow of rinse water through the nozzle. Of course, it is contemplated that flow from both reservoirs may be cut off. It is further contemplated that the illustrative valve means 88 might well include a separate valve member for the water and ink supply lines.

In order to vibrate the feed pipe 90, hence, the nozzle 92, to introduce the varicosities previously mentioned, there is provided an electromechanical transducer 106 which is mechanically coupled to the feed pipe 90. The electromechanical transducer 106 may well be a magnetostrictive unit as mentioned hereinbefore. A DC power supply 108 provides a suitable bias to the transducer 106 to eliminate a double frequency pulsation. An oscillator 110 provides an oscillatory signal which, when amplified by a power amplifier 112, is applied as a driving signal for the transducer 106. Thus, if the desired rate of occurrence of the ink droplets 120,000 per second, the oscillatory signal produced by the oscillator is also 120 kilocycles per second.

The intelligence signals which are to be recorded are derived from any suitable signal source 114. The signal source 114 may be substantially any means for producing an electric signal representative of a variable quantity being monitored. The signals from the source 114 are amplified by a signal amplifier 116. THe amplified output signals of the amplifier 116 appear across a pair of output leads 118 and 120. The first of these leads is coupled to the ink in the feed pipe 90 by connection to or through the feed pipe 90. The other lead 120 is connected to a charging electrode 122. As previously explained, the charging electrode 122 surrounds the issuing ink stream in the region where the stream breaks up into a series of discrete droplets. Under these conditions, the individual droplet will carry with it an electrostatic charge which is a function of the instantaneous value of the signal appearing across the two leads 118 and 120 at the instant of separation of the droplet from the body of the ink.

A high voltage power supply 124 produces a constant DC output voltage of a suitable high value. In a successfully operated recorder constructed in accordance with this invention, the power supply produced a positive 8,000 volts and a negative 8,000 volts for a total potential difference of 16,000 volts. The output of this power supply 124 is connected to a pair of deflection electrodes 126 positioned about one-half inch apart, respectively, on opposite sides of the stream of charged ink droplets. Thus energized and positioned, the deflecting electrodes 126 produce a substantial electric field between them. Each droplet, as it passes through this field, in accordance with the laws of charged particles moving in an electric field, is deflected from its original course by an amount which is a function of the magnitude of the charge on the droplet in a direction which is a function of the polarity of the charge on the droplet, the polarity and magnitude of the electric field being predetermined and constant.

In order to minimize the occurrence of distortions in the recording of signals occasioned, as previously described, by the effect of the wake of one droplet on the path of succeeding droplets, there is provided a source of air flow 128. Air flowing from this source 128 is caused to pass through an air flow smoothing filter 130 to produce laminar flow of the air. The laminar flow of air is then directed to flow through the region embracing the path of the ink droplets. The direction of the air flow may be either collinear with the flow of the ink droplets, as shown in FIGS. 3 and 4, or perpendicular to the flow of ink, as shown in FIG. 5. It will also be apparent that a flow of air may well be in a direction which is intermediate to the collinear and perpendicular flows.

Figure 7:
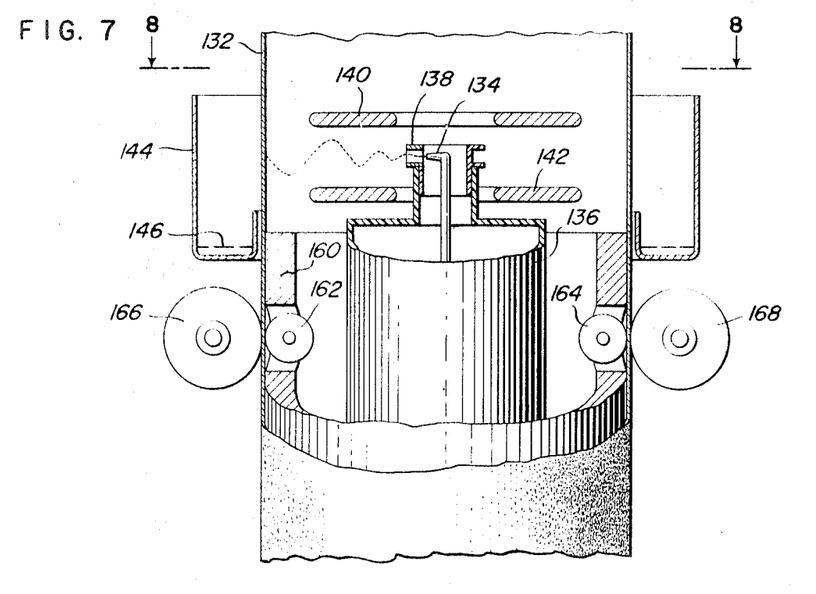
FIG. 7 is a schematic representation illustrating a cross-sectional view of a somewhat different form of apparatus embodying the present invention.
Figure 8:
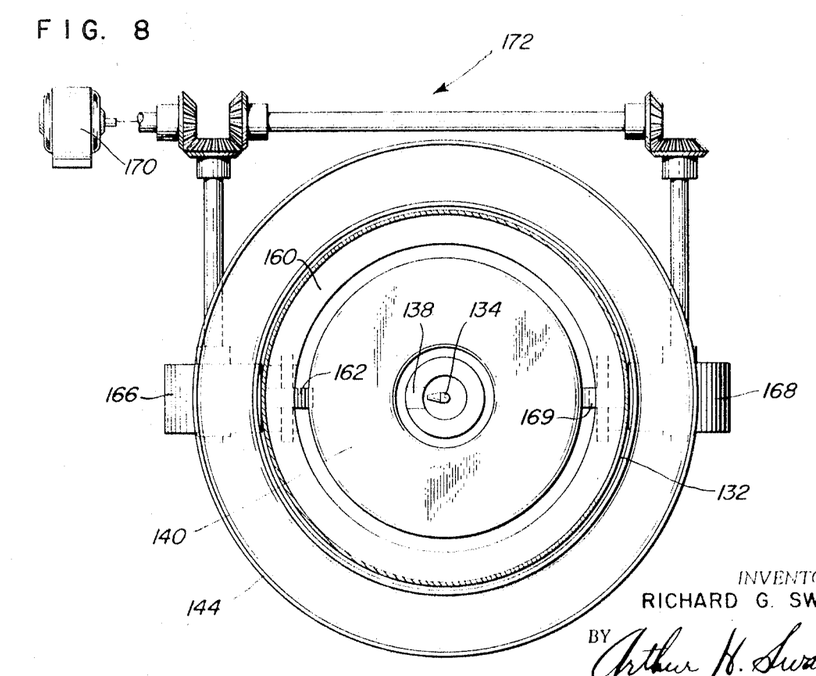
FIG. 8 is a top view taken along the line 8-8 of FIG. 7.

A different form of structure which also embodies the present invention is shown in FIGS. 7 and 8. On that form, the record receiving member 132 is a relatively wide web member which, at the recording position, is formed into a cylinder. Suitable means are provided for advancing the record receiving member, relative to the recording position, in a direction which is axial of the formed cylinder. The record receiving member 132 is formed into a cylindrical configuration about a cylindrical record guide member 160. The guide member carries a pair of pressure idler rollers 162, 164, respectively, at diametrically opposite locations. These rollers 162 and 164 are mounted in suitable recesses in the walls of the guide member in positions to engage the inner surface of the record member 132. A pair of driving rollers 166 and 168 are mounted externally of the cylinder formed by the record member 132 in a position to engage the outer surface of the record member 132 opposite, respectively, the pressure rollers 162, 164. The two drive rollers 166 and 168 are synchronously driven as from a common source, such as a motor 170, by means of a suitable drive coupling 172. Another means for advancing the record member may be substantially similar to that shown in the U.S. Pat. No. 2,912,518, issued in the name of A. R. Maxey. The stream of ink droplets is projected from a nozzle 134, as before. In this instance, however, the nozzle 134, together with its associated elements, as indicated at 136, is mounted on means, not shown, for rotating the nozzle about the axis of the cylinder defined by the record receiving member 132. The ink droplets from the nozzle 134 are projected through a charging electrode 138, which is also part of the rotating structure. The charged droplets then pass between a pair of deflecting electrodes 140 and 142, respectively. In this structure, the deflecting electrodes are each in the form of a flat toroid or ring. The two ring-shaped electrodes are supported in parallel spaced relation so that the ink droplets may freely pass between them.

As the nozzle 134 and its associated elements rotate, the projected ink stream would tend to lay down a circular trace on the record member 132. However, since the record member 132 is being advanced through the instrument at a uniform rate, the ink trace becomes basically a helix. The deflection of the ink droplets, in accordance with the signal charge on them, will be in a direction transverse of the basic helix rather than transverse of the direction of travel of the record member, as in the structures hereinbefore described. Since the nozzle rotates as the ink is being emitted, each droplet follows a path which is slightly displaced about the axis of rotation of the nozzle from that of the preceding droplet. Thus, the droplets do not follow each other along the same path, hence they avoid the influence of the wake of the preceding droplets.

Since the ink is projected from the rotating nozzle 134 at relatively high velocity, if the instrument should happen to be turned on when no record receiving member is in place, a rather disturbing mess might ensue. In order to avoid such an occurrence, there is provided an ink collector ring 144 which is positioned externally of the record member position and bridging the free space between the two deflecting electrodes 140, 142. The collector ring 144 is formed with a trough 146 along its lower edge. Thus, if the instrument should be turned on when no recording paper is in position, or if the supply of recording paper runs out while the instrument is still in operation, any projected ink that escapes beyond the position of the record member 132 will be intercepted by the collector ring 144. THe intercepted ink will be collected in the trough 146 from where it may be conducted to a suitable reservoir.

Figure 9:
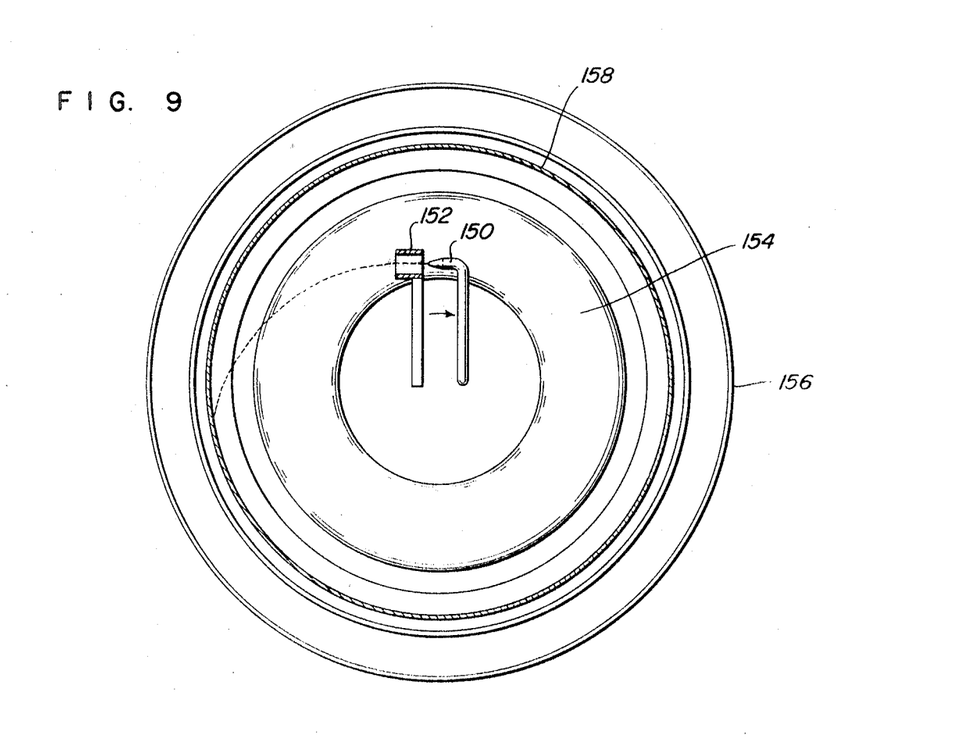
FIG. 9 is a view similar to that of FIG. 8 but showing a still different structure embodying the present invention.

A very similar structure is shown in FIG. 9. This structure is the same as that of FIGS. 7 and 8 with the exception that the nozzle 150 and the charging electrode 152 are extended, bent at a right angle and positioned for rotation in the space between the two deflecting electrodes 154. The nozzle 150 is directed backward with respect to the direction of rotation of the nozzle. This construction adds to that of FIGS. 7 and 8 the further advantage that the relative velocity of the emitted ink droplets may be high with respect to the nozzle and low with respect to the deflecting electrodes, permitting high sensitivity to deflecting signals. Again, an ink collector ring 156 is positioned externally of the record receiving member 158 to catch any escaping ink droplets.

Figures 10, 12A:
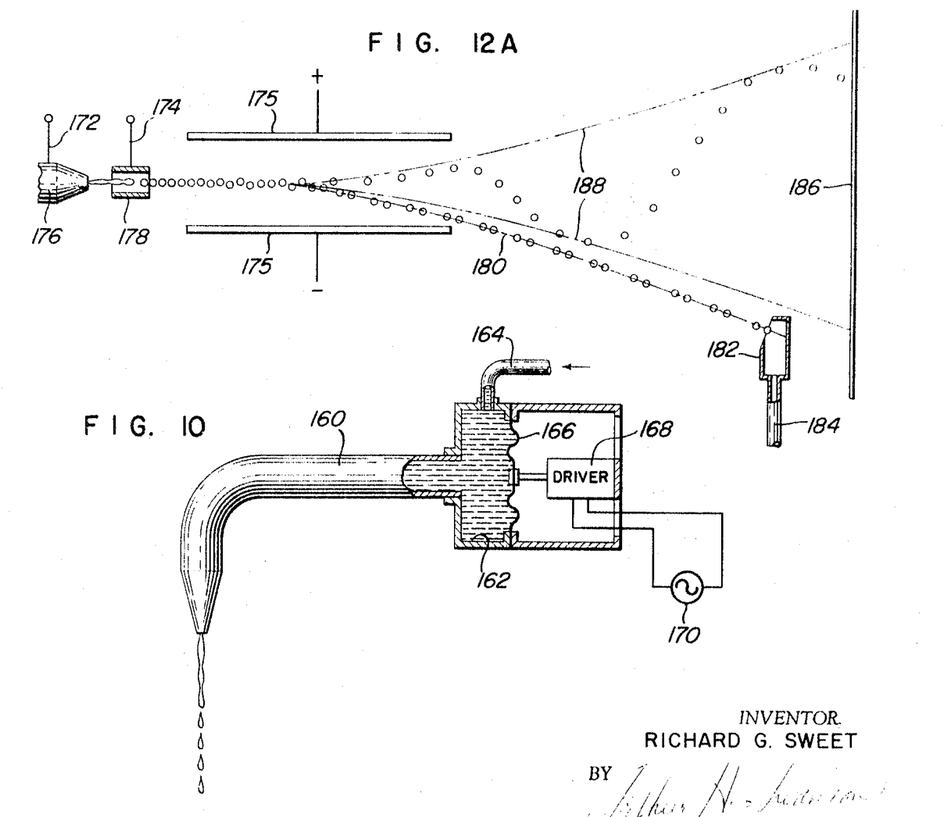
FIG. 10 is a fragmentary view of a portion of the system somewhat similar to that shown in FIG. 2 and 2A but illustrating a different form of apparatus for carrying out the function.
FIGS. 12A and 12B are schematic representations of a somewhat different form of structure also embodying the present invention.

In FIG. 1 there is illustrated a means for introducing the varicosities into the stream of ink flowing from the nozzle which includes means for vibrating the nozzle itself. In FIGS. 2 and 2A there is shown a different means for accomplishing the varicosities in the issuing stream of ink through the introduction of internal stresses in the ink stream by the action of superimposed electric fields. In FIG. 10 there is illustrated still another means for effecting the varicosities in the issuing stream of ink. In the structure illustrated in FIG. 10 the varicosities are introduced by the introduction of variations in the pressure head of the ink supplied to the nozzle. The structure shown in FIG. 10 includes a nozzle 160 connected to a reservoir 162. The reservoir and the nozzle are supplied with ink under relatively high pressure through a feed pipe 164. One wall of the reservoir 162 includes a movable member such as diaphragm 166. The movable member or diaphragm 166 is mechanically connected to a electromechanical transducer 168 which constitutes a driver for the diaphragm 166. The driver 168 may be in the form of a magnetostrictive or piezoelectric transducer, or in the form of a dynamic moving coil transducer. As before the transducer may be energized from an exciting source of high-frequency signals 170, which signals alternate at the frequency necessary to produce the high rate of varicosity in the issuing ink stream. In operation ink is supplied through lead pipe 164 to the reservoir 162, filling the reservoir and the nozzle 160. The ink is supplied under the desired relatively high pressure as in the previously described structures. An alternating pressure wave is superimposed upon the pressure head of the ink supply by operation of the diaphragm 166 under the influence of the driver 168. The resulting variations in pressure produced the desired varicosities in the issuing stream of ink. These varicosities, as before, cause the issuing of ink to break up onto regularly spaced uniformly dimensioned discrete droplets.

Figure 11:
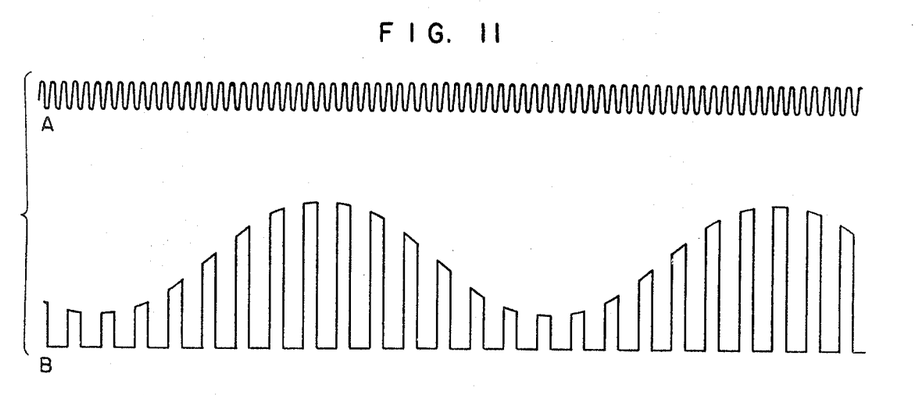
FIG. 11 is a pair of wave trains illustrating the time relationship of certain functions of the apparatus illustrated in FIGS. 12A, 12B, and 13.
Figure 12B:
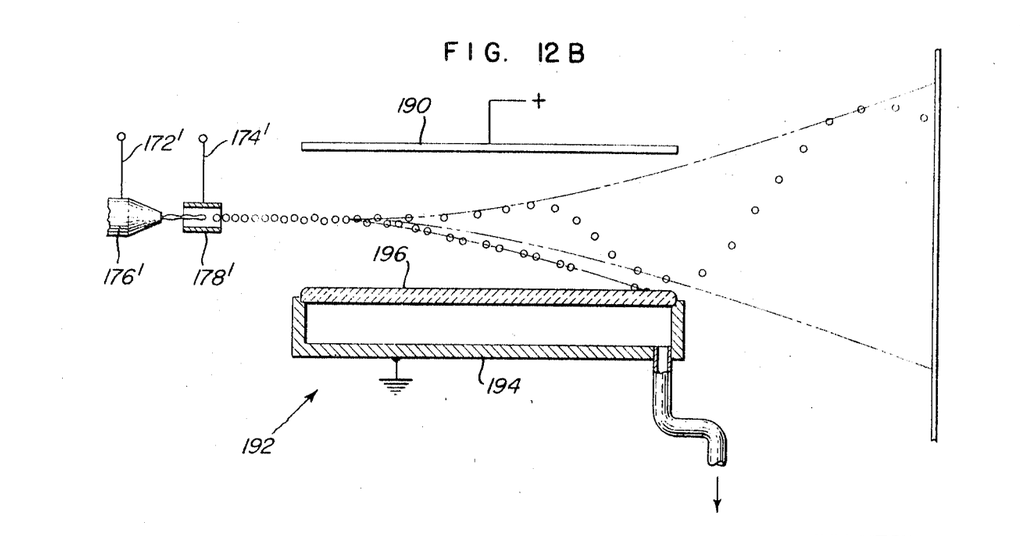

It has been found, under certain conditions, that if all of the droplets issuing from the nozzle are allowed to strike the member, an indistinct image or trace would be produced because of an excessive amount of ink. Since the drop formation rate is primarily a function of the inherent mechanics of the system, including the mechanical characteristics of the ink supply itself, it would not be expedient nor practicable to produce a slower drop rate. Accordingly, there has been provided, in accordance with the present invention, means for intercepting a portion of the droplets on a controlled interval basis. The interception of the selected droplets may be accomplished by causing the selected droplets to be deflected from the normal recording path and to be directed to a suitable collector. This principle is illustrated in FIGS. 11, 12A, and 12B. In FIG. 11 there is shown a pair of wave trains representative of the signals applied to the system to accomplish the selective deflection and interception of the droplets. Curve A of FIG. 11 shows a series of pulses as applied to the droplet formation mechanism, each pulse representing a single droplet. Curve B is representative of a composite series of pulses applied to the droplet charging means, for example to the leads 172 and 174 of FIG. 12A. These leads are connected respectively to the nozzle 176, hence to the ink supply, and to the charging electrode 178. In the arrangement illustrated in FIGS. 11, 12A and 12B, one-third of the droplets are employed to record the applied intelligence signal. The remaining two-thirds are deflected and intercepted. In order to accomplish such a selection the signals applied to the droplet charging means must be synchronized with pulses applied to the droplet formation mechanism. Thus the pulses of Curve A are employed to trigger suitable pulse producing means such that during the interval of two adjacent pulses of Curve A, a bias signal of suitable polarity and magnitude is applied across the leads 172 and 174 such as to cause the selected droplets, under the influence of the electric field produced between the deflecting electrodes 175, to follow the trajectory 180. This path or trajectory, as shown in FIG. 12A, causes the selected droplets to be deflected into an opening in an intercepting receptacle 182. The receptacle 182 may be connected by a hose 184, or the like, to a suitable pump which returns the collected ink to the ink reservoir. During the interval of a signal pulse from Curve A, the intelligence signal representative of the data to be recorded is applied across the leads 172 and 174 instead of the fixed bias. The droplets that are charged during these signal droplet intervals are charged to a potential representative of the instantaneous value of the data or intelligence signal. THese droplets are then directed toward the record member 186 along their individual trajectories within the envelope 188. As these droplets impinge upon the record member 186 they produce a record of the applied signal. The parameters of the system are so chosen that the fixed bias signal is of an absolute magnitude which is greater than the maximum data signal encountered. THus, only the selected droplets corresponding to the intervals of fixed bias are deflected into the intercepting receptacle 182 and all of the droplets representative of data signals are permitted to strike the record member 186.

The apparatus shown in FIG. 12B is essentially the same as that shown in FIG. 12A with the exception of the intercepting means for the bias deflected droplets. Accordingly, corresponding parts are given reference numerals which correspond to those of FIG. 12A but with a prime superscript. Again, the signals corresponding to those illustrated in FIG. 11 are applied to the leads 172' and 174', connected, respectively, to the nozzle 176' and the charging electrode 178'. The bias signals cause the droplets to follow the trajectory 180', the path in which the droplets are intercepted. The intelligence signals cause the corresponding droplets to be directed toward the record member 186' along their individual trajectories within the envelope 188'. The structure illustrated in FIG. 12B differs from that of FIG. 12A in the nature of the deflecting electrodes and the intercepting collector. In FIG. 12B, one of the deflecting electrodes 190 may be the same as those heretofore described, a conventional metallic or conductive plate. The other electrode 192 is unique in that this electrode also serves as the intercepting collector for the bias charged droplets. To this end, the electrode 192 comprises a hollow shell member 194 made of an impervious conductive material such as brass or the like, and a face or cover member 196 made of a suitable porous material which is either inherently conductive or may be rendered conductive. The material of the face member 196 may be a porous ceramic which is normally nonconductive but which becomes conductive when it is wet by the conductive writing fluid. Alternatively, the face member 196 may be made of a porous metallic material such as sintered powdered metal, a substance which is inherently electrically conductive.

As the charged droplets are projected between the electrodes 190 and 192, those droplets charged in accordance with the bias signal are deflected by the electric field established between the electrode 190 and the electrode 192 to follow the trajectory 180'. In this path, the droplets impinge upon the surface of the porous face member 196. The chamber defined within the electrode 192 is maintained under at least a partial vacuum. Consequently, the droplets of writing fluid that impinge upon the porous face member 196 are drawn through that face member into the inner chamber. From the chamber within the electrode 192, the collected writing fluid is carried away through an exhaust line 198 and returned to a suitable reservoir.

In accordance with the system thus described, and assuming that the sampling ratio is as illustrated, every third droplet is charged in accordance with the desired data signal while the intervening two droplets are charged in accordance with the fixed bias signal and are deflected into the receptacle 182. It will be appreciated, of course, that the system may be arranged to provide any desired ratio in the number of data droplets and to the number of selected intercepted droplets. For example, with a relatively slow speed of advancement of the record member 186, sampling rate for the data charged droplets might well be one per hundred, with 99 percent of the produced droplets charged in accordance with the fixed bias and deflected into the intercepting receptacle.

Figure 13:
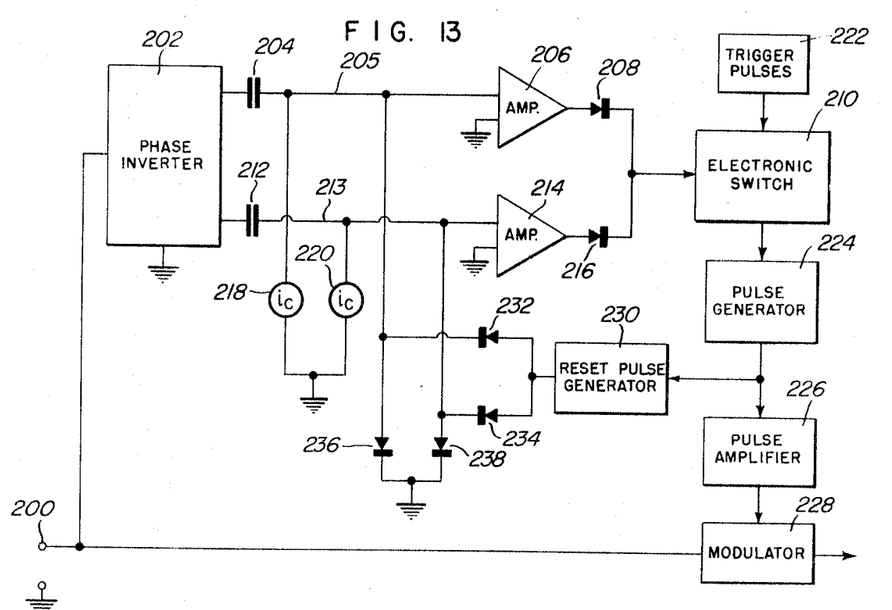
FIG. 13 is a schematic circuit diagram of a controlled circuit for use in effecting the operation illustrated in FIG. 12.

In the system illustrated in FIGS. 11, 12A, and 12B and described in connection therewith, the ratio of data charged droplets to the selected and intercepted droplets is constant. In FIG. 13 there is illustrated a circuit wherein the sampling rate, although still synchronized with the droplet forming signals, is variable in accordance with the rate of change of the data signal. This produces a constant intensity trace.

When the proportion of droplets deflected and intercepted as compared to those actually falling on the record member remain constant, as previously described, the trace appears to be of substantially uniform intensity so long as the input signal is constant or changes very slowly. When, however, a rapid change occurs in the signal, the signal trace is of less intensity during those intervals of rapid change, and, of greater intensity during intervals of slight or no change. Such a trace might, under some circumstances, result in a highly undesirable or even confusing record. In order to obviate such a condition, means are provided for controlling the delivery rate of the writing droplets in accordance with the rate of change of the signal to be recorded. The system illustrated in FIG. 13 provides means for so controlling the delivery rate of the writing droplets, those actually falling on the record member, that a minimum number of droplets are provided when the input signal is unchanging; then the droplet rate is increased in accordance with the derivative of the changing input signal. To this end, the input signal from the terminal 200 is applied to a phase inverter 202 whereby the input signal is divided into two channels such that positive going changes in the input signal produce a signal of the proper polarity in one of the channels and negative going changes in the input signal produce a signal of the same polarity in the other channel.

In the first channel, the output signal from the phase inverter 202 is applied to one electrode of a capacitor 204. The other electrode of the capacitor 204 is connected by a lead 205 to an amplifier 206. The output of the amplifier 206 is connected, through a diode 208 to an electronic switch 210. Similarly, in the second channel, the output signal from the phase inverter 202 is applied to one electrode of a capacitor 212. The other electrode of the capacitor 212 is connected, by a lead 213 to an amplifier 214. The output of the amplifier 214 is connected, through a diode 216, also to the input of the electronic switch 210. A constant current source 218 is connected to the lead 205. Similarly, a constant current source 220 is connected to the lead 213.

The electronic switch is of the type which is "normally open" until the control signal reaches a predetermined threshold value. At such time as the threshold value obtains, the electronic switch will be "closed," allowing applied signals to be passed through to subsequent equipment. In the instant case, the control signal applied to the electronic switch 210, is that signal derived from either of the two signal channels coupled to the output of phase inverter 202.

If the input signal applied to the phase inverter is constant, no signal resulting therefrom is transmitted, as a charge signal, across either of the capacitors 204 or 212. Under these conditions, the minimum control signal is developed by the current signal applied to the capacitors 204 and 212 from the constant current sources 218 and 220. The current from these sources provide a uniformly increasing charge to the capacitors 204 and 212. This, in turn, produces a signal of constant slope which is amplified by the amplifiers 206 and 214. If the amplifiers 206 and 214 are of the type which produce an output signal which is reversed in polarity from the input signal, then the signal applied to the input to the amplifier must be of opposite polarity to that required to turn the electronic switch 210 on. If it is assumed that an electrically positive signal is required to "close" the electronic switch, then the constant current sources 218 and 220 must supply a negative signal to the capacitors 204 and 212. As the capacitors 204 and 212 are charged by the current from the sources 218 and 220, respectively, the output signal from the amplifiers 206 and 214 increase until the threshold value or switching potential of the switch 210 is reached.

There is provided a source of trigger pulses 222 which pulses are synchronized with the droplet formation means associated with the nozzle. In other words, the source 222 provides a pulse of electrical energy for each droplet of writing fluid produced by the nozzle. This source 222 is connected to the electronic switch 210 so that when the switch 210 is "closed," the trigger pulses are passed to a pulse generator 224 connected to the output of the switch 210. The pulse generator 224 output is connected, first, to a pulse amplifier 226, the output of which is connected to a signal modulator 228. The output of the pulse generator 224 is also connected to a reset pulse generator 230. The output of the reset pulse generator 230 is connected, through a first diode 232, to the lead 205 and, through a second diode 234, to the lead 213. Additionally, a first clamping diode 236 is connected between the lead 205 and electrical ground and a second clamping diode 238 is connected between the lead 213 and ground.

When the switch 210 is "open" the trigger pulses from the source 222 are not passed to the pulse generator 224. When, however, the switch 210 has been "closed" by the control signal, the next trigger pulse from the source 222 is applied to the pulse generator 224. The generator 224 produces a pulse which is substantially a square wave in shape and of just sufficient width to charge a single droplet. That pulse is then amplified by the amplifier 226 and applied to the modulator 228. The output pulses from the generator 224 are also applied as input signals to the reset pulse generator 230. THe generator 230 may be in the form of a differentiator to produce a sharp pulse coincident with the leading edge of each of the pulses produced by the generator 224. These sharp pulses are then applied, through the diodes 232 and 234, respectively, to return or reset the capacitors 204 and 212 to zero. The resetting of the capacitors 204 and 212 to zero causes the electronic switch to be again "opened." Thus, a single trigger pulse from the source 222 is passed by the switch 210 each time the switch is "closed." Each time the capacitors 204 and 212 are reset to zero, they immediately begin to charge again since the constant current sources 218 and 220 continue to the repetition rate of the closing of the switch 210 depends on the charging rate of either of the capacitors.

The output of the modulator is connected to the charging electrode associated with the nozzle, such as the electrode 178' of FIG. 12B. The modulator 228 provides an output signal which, in the absence of a modulating signal, biases the charging electrode such that the droplets will all be deflected to be intercepted by the intercepting means. The signals from the pulse generator 224, amplified by the amplifier 226, are of such a magnitude and polarity that, in the absence of a modulating signal, they would cause the selected droplets to be charged to such a value that the droplets would be deflected to a maximum deflection away from the intercepting means. However, the signal input terminal 200 is also connected to the modulator 228 as a modulating input signal. Thus, the pulse signals from the pulse amplifier 226 are amplitude modulated by the input signal from the terminal. If, as has been assumed thus far, the input signal is unchanging, the repetition of the pulses from the pulse generator 224, hence the droplet selection rate, will be determined by the rate at which the capacitors 204 and 212 are charged, respectively, by the constant current sources 218 and 220. The deflection of these droplets, or relative location of the resultant trace on the record member, will be dependent upon the magnitude of the signal applied from the terminal 200.

If, now, the signal appearing at the terminal 200 should be a changing signal, the change would reflect on the charging rate of one or the other of the capacitors 204 and 212. If, for example, the change is a positive change, i.e. an increasing signal, the charging rate of the capacitor 204 is increased in proportion to the rate of increase of the input signal. The threshold level or switching potential of the electronic switch is reached at a time earlier than heretofore described by an amount which is proportional to the rate of increase of the input signal. Thus, the repetition rate of the droplet selection is increased by an amount which is proportional to the rate of change of the input signal. Accordingly, the net droplet selection is at a rate which is proportional to the first derivative of the incoming signal plus a constant, the constant being that supplied by the constant sources and may be related to the velocity of the record member.

The increasing signal which produced a change in the charging rate of the capacitor 204, would have no effect on the capacitor 212 since it would appear as an opposite polarity signal across that capacitor and the clamping diode 238 prevents that capacitor from being oppositely charged.

If, on the other hand, the incoming signal changes negatively, i.e. a decreasing signal, the capacitor 212 has its charging rate increased, producing an identical effect on the switching rate of the electronic switch 210. Under this condition, the clamping diode 236 prevents the capacitor 204 from being reversely charged.

The system described and illustrated in FIG. 13 provides means for controlling the repetition rate of the writing droplets in accordance with the absolute rate of change of the input signal, without regard to the direction of change in the signal, thereby producing on the record member a substantially constant intensity trace.

Thus, it may be seen that there has been provided, in accordance with the present invention, a graphic recorder for the direct writing of signal information which may cover a wide band of signal frequencies, and in which the direct recording is accomplished without the necessity of physical contact between the writing instrument and the record receiving member.

I claim:

1. A method of making records on a record member by use of fluid droplets, comprising the steps of supplying writing fluid to a nozzle under pressure whereby a stream of writing fluid is projected toward the record member, applying cyclically varying energy at a predetermined frequency to the writing fluid to cause the stream issuing from the nozzle to break up into a succession of separate evenly spaced uniform droplets which move in free flight and initially in single file toward the record member, causing the stream adjacent to the nozzle to pass adjacent to a charging electrode, applying variable electrical signal values representative of the desired deflections to the charging electrode whereby individual droplets are electrostatically charged to effect different charges on at least some droplets of the succession, causing the droplets thereafter to pass in proximity to a deflecting electrode, applying a potential to the deflecting electrode to produce an electrostatic deflecting field through which the droplets pass whereby charged droplets are deflected laterally, with droplets having different charges moving through different trajectories, causing relative movement between the record member and the nozzle, and causing at least some of the droplets passing through said deflecting field to be deposited on the record member to make a record thereon.

2. A method as in claim 1 in which the electrical signal values applied to the charging electrode are correlated with the cyclically varying energy applied to the fluid.

3. A method as in claim 2 in which selected droplets are intercepted and thereby not deposited on the record medium.

4. A direct writing recorder comprising means for projecting a stream of writing fluid in the form of a single file succession of spaced discrete droplets toward the surface of a record receiving member, means for supporting a record receiving member and for effecting relative movement between the same and said projecting means, means for electrostatically charging said discrete droplets in accordance with the instantaneous values of a variable signal input to effect different charges on at least some droplets of the succession, and electrostatic means for deflecting said discrete droplets in accordance with the charges carried by said droplets during the flight of said droplets between said projecting means and said record receiving member, with droplets having different charges being deflected to take different trajectories, said droplets being deposited on the surface of the record member to produce a record that is characterized by the signal variations.

5. A direct writing recorder as in claim 4 in which said droplets are formed at a predetermined rate, together with bias signal means coupled to said electrostatic charging means for placing a predetermined bias charge on selected droplets, said bias means including synchronization means for synchronizing said droplet selection with said droplet formation rate.

6. A direct writing recorder as in claim 5 in which said synchronization means causes at least two adjacent ones of said droplets to be successively charged in accordance with said input signal and with said bias charge.

7. A direct writing recorder as in claim 5 in which the magnitude of said bias signal is distinct from the range of magnitudes of said input signal whereby bias charged droplets follow a trajectory substantially different from trajectories followed by droplets charged in accordance with said input signal.

8. A direct writing recorder as in claim 7 together with intercepting means located in said trajectory of said bias charged droplets for preventing such droplets from striking said record receiving members.

9. Apparatus as in claim 5 together with means for intercepting said selected droplets.

10. A direct writing recorder comprising means for projecting a stream of writing fluid in the form of a single file succession of spaced discrete droplets toward the surface of a record receiving member, means for supporting a record receiving member and for effecting relative movement between the same and said projecting means, means for electrostatically charging said discrete droplets in accordance with the instantaneous values of a variable signal input to effect different variable on at least some of the droplets of the succession, a pair of electrostatic deflecting electrodes positioned, respectively, on opposite sides of said stream of droplets, and means for applying a constant unidirectional electrostatic charge to said deflecting electrodes to produce a constant electric field therebetween whereby to deflect the path of said discrete droplets in their course between said projecting means and said record receiving member in accordance with the charges carried by said discrete droplets, with droplets having different charges being deflected to take different trajectories, said droplets being deposited on the surface of the record member to produce a record that is characterized by the signal variations.

11. A direct writing recorder comprising means for projecting a stream of writing fluid toward a record receiving member, means for supporting a record receiving member and for effecting relative movement between the same and said projecting means, means for introducing regularly spaced varicosities in the stream of said writing fluid to assure the formation of a succession of discrete droplets of uniform dimension at a constant rate, means for electrostatically charging said discrete droplets in accordance with the instantaneous values of a variable signal input to effect different charges on at least some droplets of the succession, a pair of electrostatic deflecting electrodes positioned, respectively, on opposite sides of said stream of droplets, and means for applying a constant unidirectional electrostatic charge to said deflecting electrodes to produce a constant electric field therebetween whereby to deflect the path of said droplets in their course between said projecting means and said record receiving member in accordance with the charges carried by said discrete droplets, with droplets having different charges being deflected to take different trajectories, said droplets being deposited on the surface of the record member to produce a record that is characterized by the signal variations.

12. The invention as set forth in claim 11 wherein said means for introducing said varicosities in said stream comprises electromechanical vibrating means mechanically coupled to vibrate said nozzle, and means for exciting said vibrating means at the desired formation rate.

13. A direct writing recorder comprising, in combination, means for projecting a stream of writing fluid toward a record receiving member including a nozzle, means for supporting a record receiving member and for effecting relative movement between the same and said projecting means, a feed pipe connected to said nozzle for supplying writing fluid thereto, and means for establishing a substantial pressure head on said fluid in said feed pipe; means for introducing regularly spaced varicosities in the stream of said writing fluid to assure the formation of a succession of discrete droplets of uniform dimension and at a constant rate; means for electrostatically charging said discrete droplets in accordance with the instantaneous values of a variable signal input to effect different charges on at least some droplets of the succession; a pair of electrostatic deflecting electrodes positioned, respectively, on opposite sides of said stream of droplets; and means for applying a constant unidirectional electrostatic charge to said deflecting electrodes to produce a constant electric field therebetween whereby to deflect the path of said droplets in their course between said nozzle and said record receiving member in accordance with the charges carried by said discrete droplets, with droplets having different charges being deflected to take different trajectories, said droplets being deposited on the surface of the record member to produce a record that is characterized by the signal variations.

14. The invention as set forth in claim 13 wherein said means for introducing said varicosities in said stream comprises an electrode positioned adjacent said nozzle and surrounding said stream and means for establishing an oscillatory electrostatic field between said stream and said electrode.

15. The invention as set forth in claim 13 wherein said means for introducing said varicosities in said stream comprises means for vibrating said nozzle.

16. The invention as set forth in claim 15 wherein said vibrating means comprises an electromechanical transducer.

17. The invention as set forth in claim 15 wherein said vibrating means comprises a magnetostrictive driving element mechanically coupled to said feed pipe and means for exciting said magnetostrictive element at the desired formation rate.

18. The invention as set forth in claim 13 wherein said means for charging said droplets comprises a charging electrode spaced slightly from said nozzle and surrounding said stream at the point of the formation of said droplets, and means for applying a charging signal between said fluid and said charging electrode.

19. The invention as set forth in claim 13 and characterized by the addition of means for introducing a laminar flowing stream of air into the area embracing said stream of droplets whereby to reduce interaction between successive droplets.

20. The invention as set forth in claim 19 wherein said stream of air is collinear with said stream of droplets.

21. The invention as set forth in claim 19 wherein said stream of air is perpendicular to said stream of droplets.

22. The invention as set forth in claim 13 wherein said record receiving member defines a cylindrical surface for the reception of said ink droplets, said deflection electrodes are in the form of a pair of flat, parallel toroids, and means are provided for rotating said nozzle about the axis of said cylindrical surface whereby said stream of droplets define a substantially circular trace about said axis.

23. A direct writing recorder as in claim 13 wherein said means for introducing varicosities in said stream comprises means for introducing superimposed fluctuations in the established pressure head on said fluid, said fluctuations being at the desired rate of formation.

24. A direct writing recorder comprising, in combination, means for projecting a stream of writing fluid toward a record receiving member including a nozzle, a feed pipe connected to said nozzle for supplying writing fluid thereto, and means for establishing a substantial pressure head on said fluid in said feed pipe; electromechanical vibrating means for vibrating said nozzle to introduce regularly spaced varicosities in the issuing stream of said writing fluid to assure the formation of a succession of discrete droplets of uniform dimension and at a constant rate; means for exciting said vibrating means at the desired formation rate; a charging electrode positioned adjacent said nozzle and surrounding the path of said stream; means for applying a charging signal between said fluid and said charging electrode whereby to electrostatically charge said discrete droplets in accordance with the instantaneous values of an input signal; a pair of electrostatic deflecting electrodes positioned, respectively, on opposite sides of said stream of droplets; means for applying a constant unidirectional electrostatic charge to said deflecting electrodes to produce a constant electric field therebetween whereby to deflect the path of said droplets in their course between said nozzle and said record receiving member in accordance with the charges carried by said discrete droplets; guide means for guiding said record receiving member in a position to receive said stream of droplets; and record receiving member driving means for driving said record receiving member through said guide means.

25. A direct writing recorder comprising means for projecting a stream of writing fluid toward a record member, means for introducing regularly spaced varicosities in the stream of said fluid to assure the formation of droplets of uniform dimension and at a constant rate, means for electrostatically charging selected ones of said discrete droplets in accordance with the instantaneous values of a signal input, means for causing the remainder of said discrete droplets to have a common charge value, a pair of electrostatic deflecting electrodes positioned, respectively, on opposite sides of said stream of droplets, means for applying a constant unidirectional electrostatic charge to said deflecting electrodes to produce a constant electric field therebetween whereby to deflect the path of said droplets in their course between said projecting means and said record receiving member in accordance with the charges carried by said discrete droplets, and means for intercepting those droplets having said common charge value.

26. The invention as set forth in claim 25 wherein said intercepting means comprises a receptacle positioned adjacent the path of said droplets and into which the common charge value droplets are directed.

27. The invention as set forth in claim 25 wherein said intercepting means includes one of said deflecting electrodes, said one of said electrodes comprising a hollow shell member formed of impervious conductive material and a face member formed of material which is pervious to the writing fluid and onto which the common charge value droplets impinge and means for drawing the intercepted droplets through said pervious member into said hollow shell member.

28. The invention as set forth in claim 25 wherein the ratio of the number of said selected droplets to the number of the common charge value droplets is a predetermined fixed ratio.

29. The invention as set forth in claim 25 wherein the ratio of the number of the selected droplets to the number of the common charge value droplets is a function of the rate of change of the signal input.

30. A direct writing recorder comprising means for projecting a stream of writing fluid in the form of a single file succession of spaced, discrete droplets toward the surface of a record receiving member, means for supporting a record receiving member and for effecting relative movement between the same and said projecting means, means for characterizing said discrete droplets in accordance with the instantaneous values of a variable signal input to effect different characterizations on at least some droplets of the succession, and means for deflecting said discrete droplets in accordance with the characterizations of said droplets during the flight of said droplets between said projecting means and said record receiving member, with droplets having different characterizations being deflected to take different trajectories, said droplets being deposited on the surface of the record member to produce a record that is characterized by the signal variations.

31. A direct writing recorder as in claim 30 in which the means for characterizing the discrete droplets consists of means for electrostatically charging the droplets and in which the means for deflecting the discrete droplets consists of means forming an electrostatic field through which the droplets are projected.

32. A direct writing recorder as in claim 31 together with a droplet interceptor disposed whereby predetermined ones of the droplets that are so characterized are projected toward and intercepted by the same.

33. Liquid droplet recording apparatus comprising, means for forming a fluid jet by supplying fluid to an orifice at a pressure sufficient to cause fluid to issue from the orifice as an unsupported stream, means for providing periodic varicosities in said jet to cause it to divide at predetermined intervals into a single file succession of discrete droplets, means for establishing a droplet charging electric field at the region of said fluid jet where said drop division occurs including means for varying said electric field with time as a function of the instantaneous values of a variable signal input to charge the droplets in accordance with said instantaneous values to effect different charges on at least some droplets of the succession, means for establishing a deflecting electric field in a region traversed by said droplets for causing said drops so charged to follow trajectories that are a function of the amount of charge on said droplets, and means for collecting said droplets, said last means serving to collect droplets having different trajectories in different regions.

PO-1050
(5/69)

UNITED STATES PATENT OFFICE
CERTIFICATE OF CORRECTION

Patent No. 3,596,275      Dated July 27, 1971

Inventor(s) Richard G. Sweet

It is certified that error appears in the above-identified patent and that said Letters Patent are hereby corrected as shown below:

First page [72] correct applicant's address to read as follows:
--Richard G. Sweet, 747 Layne Court, Palo Alto, CA 94303--;
[56] Under "References Cited" insert the following:
--United States Patents

| | | | |
|---|---|---|---|
| 1,882,043 | 10/1932 | Schroter | 178-96X |
| 2,512,743 | 6/1950 | Hansell | 118-300 |
| 2,577,894 | 12/1951 | Jacob (A) | 346-75 |
| 2,600,129 | 6/1952 | Richards | 317-3 |
| 2,676,868 | 4/1954 | Jacob (B) | 346-75 |
| 3,060,429 | 10/1962 | Winston | 346-1 |

--
[56] In first and third cited "Other References" correct "Magaruey & Taylor" to read --Margarvey & Taylor--. Column 2, line numbered 40 (actually 39) substitute --The-- for "THe". Column 3, line numbered 59 (actually 57), substitute --The-- for "THe". Column 5, line numbered 35 (actually 34) substitute --The-- for "THe". Column 7, line numbered 41 (actually 40) delete "of"; same line, substitute --into-- for "onto". Column 8, line numbered 16 (actually 15) substitute --These-- for "THese"; column 8, line numbered 22 (actually 21) substitute --Thus-- for "THus". Column 10, line numbered 36 (actually 35) substitute --The-- for "THe"; column 10, line numbered 47 (actually 46) after "continue to" insert --operate.--; column 10, line numbered 48 (actually 47) change "the repetition" to --The repetition--. Column 12, line numbered 33 (actually 32) substitute --member-- for "members"; column 12, line numbered 44 (actually 43) substitute --charges-- for "variable". Column 14, line 29, after "record" insert --receiving--.

Signed and sealed this 28th day of March 1972.

(SEAL)
Attest:

EDWARD M. FLETCHER, JR.
Attesting Officer

ROBERT GOTTSCHALK
Commissioner of Patents